May 19, 1970

D. E. SPEERS 3,512,882

ELECTRO PHOTOGRAPHY SYSTEM

Filed Dec. 17, 1965

INVENTOR
DANIEL E. SPEERS

BY
ATTORNEYS

May 19, 1970

D. E. SPEERS 3,512,882

ELECTRO PHOTOGRAPHY SYSTEM

Filed Dec. 17, 1965

INVENTOR
DANIEL E. SPEERS

BY
ATTORNEYS

May 19, 1970 — D. E. SPEERS — 3,512,882
ELECTRO PHOTOGRAPHY SYSTEM
Filed Dec. 17, 1965 — 4 Sheets-Sheet 3
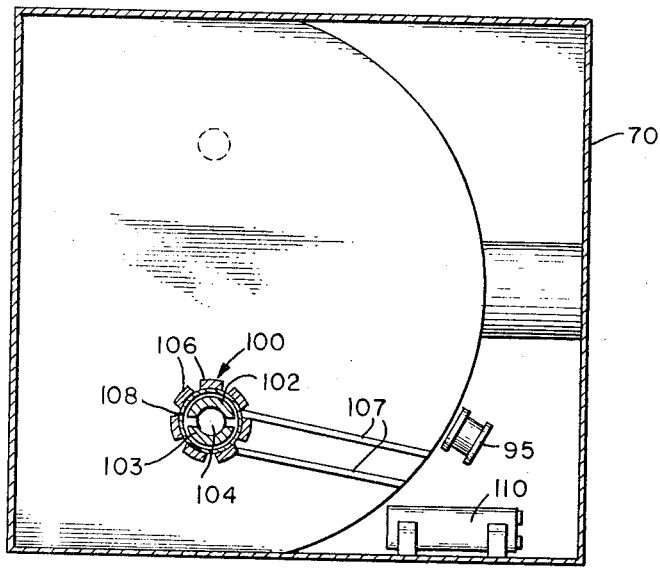
FIG. 6
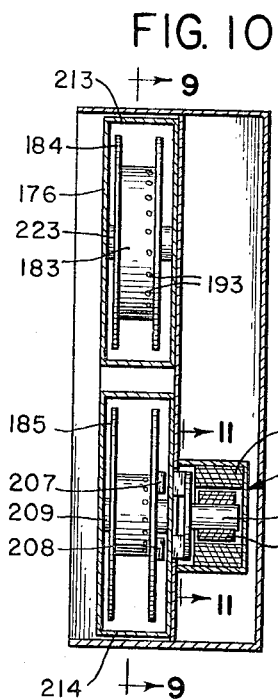
FIG. 10
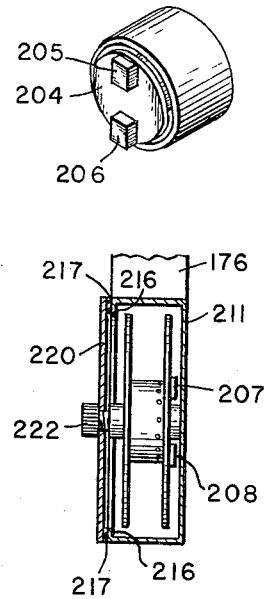
FIG. 11
FIG. 13
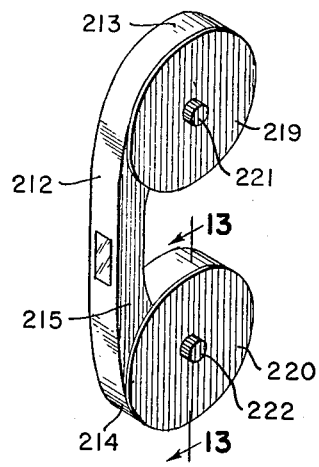
FIG. 12
INVENTOR
DANIEL E. SPEERS
BY
ATTORNEYS

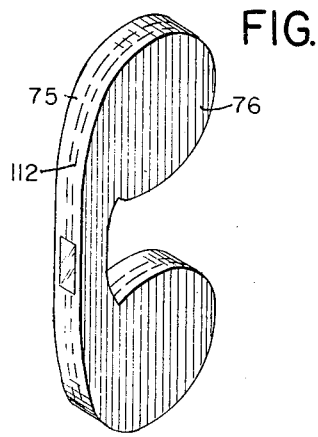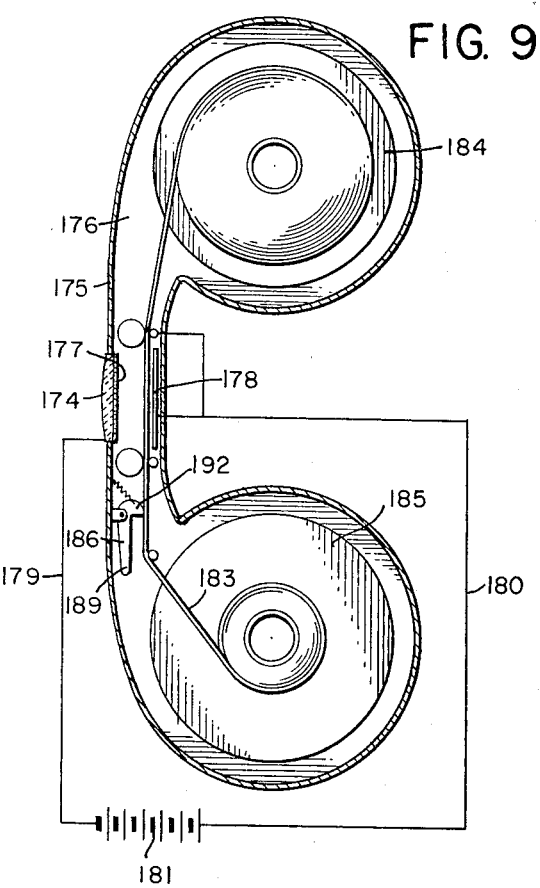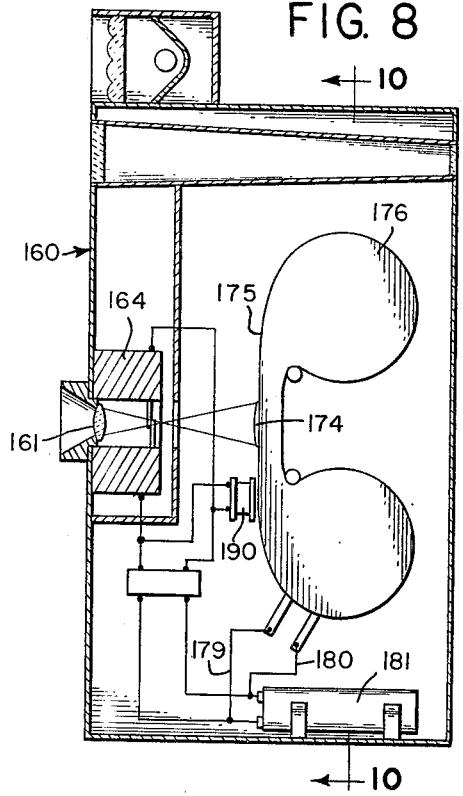

United States Patent Office 3,512,882
Patented May 19, 1970

3,512,882
ELECTRO PHOTOGRAPHY SYSTEM
Daniel Earle Speers, Radford, Va., assignor to Slaughter, Byers, Icenhour & Jackson, Bristol, Tenn., a partnership
Filed Dec. 17, 1965, Ser. No. 514,470
Int. Cl. G03b 23/02, 27/04
U.S. Cl. 352—244                                4 Claims

ABSTRACT OF THE DISCLOSURE

An electrical photography apparatus in which electrically charged particles are emitted from an image screen in amounts varying with the intensity of light striking the screen at various points and are attracted towards a charged surface, but strike a film mounted between the screen and the charged surface. The film has a coating consisting principally of two parts powdered metallic sodium and one part powdered sulphur suspended in paraffin such that visible images are formed when the film is struck by the charged particles. The apparatus is incorporated in a motion picture camera in which the image screen and the film are contained in a separable film cartridge, and a magnetic connection is provided between the camera drive mechanism and the cartridge.

---

This application relates to the field of image reproduction generally, to electro photography specifically, and more particularly to a method and apparatus for preparing a relatively permanent reproduction of an image on a film substantially simultaneously with the projection of a light image which is received in another part of the apparatus.

Most presently available equipment for photography and for document copying utilizes time consuming chemical or electrical processes for developing latent images and requires complex and expensive apparatus.

In the photographic field most presently used processes require chemical development of latent images formed by light on films. Such development steps are ordinarily carried out in laboratories after the film is removed from the camera. Some cameras include built-in apparatus for the chemical development of the latent image by the photographer immediately after exposure of the film, but these steps delay taking of additional pictures. Such quick developing apparatus, to the best knowledge of applicant, is not yet suitable for motion picture use. Except in a few cases the apparatus has not been particularly suitable for attachment to prior art cameras designed for use with films intended for later separate chemical development.

Many persons find the insertion of film within cameras to be inconvenient. This has encouraged the development of cameras in which film is mounted in cartridges which can be easily inserted in the cameras. Most cartridges are suitable only with cameras particularly designed for the cartridge.

In the document copying field considerable commercial success has also been recently achieved by copying machines operating on electrical principles. Utilization of these however, has been limited by the complexity of the machinery presently required.

Among the objects of the present invention is the provision of a simple apparatus and method for:

(1) Preparation of a relatively permanent reproduction of an image on a film practically simultaneously with the exposure of a light image on a portion of the apparatus.

(2) Avoidance of complex and expensive apparatus for the development of latent images.

(3) Avoidance of delay between the taking of individual pictures.

(4) Provision of a structure simple enough and compact enough for use with motion picture cameras, and for insertion within existing cameras manufactured for use with films requiring separate chemical development of latent images.

(5) Provision of apparatus which is simple and compact enough to permit mounting of the film and the appropriate image development equipment within a sealed magazine suitable for insertion within cameras, thus avoiding complex film threading and winding steps.

Figure 1:
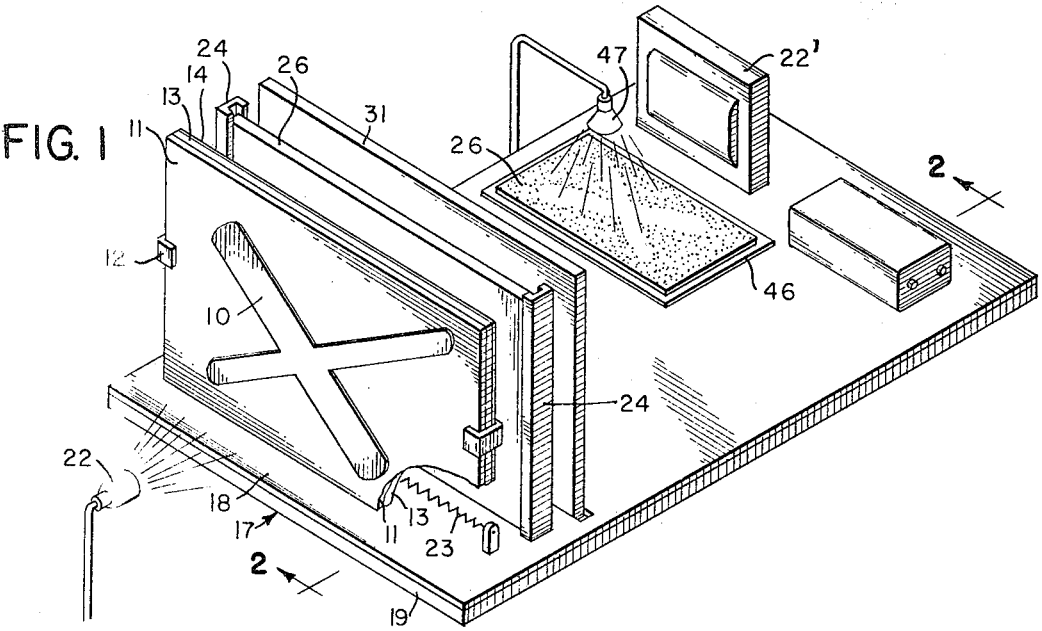
Figure 2:
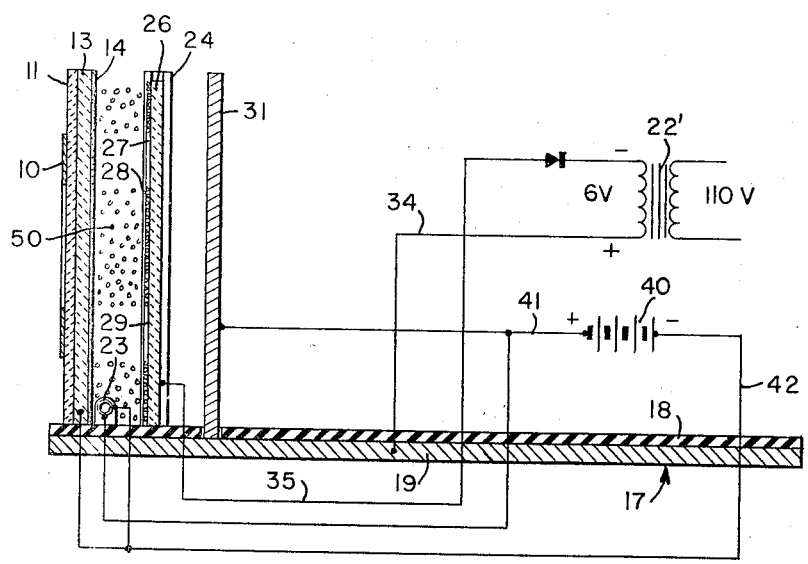
Figure 4:
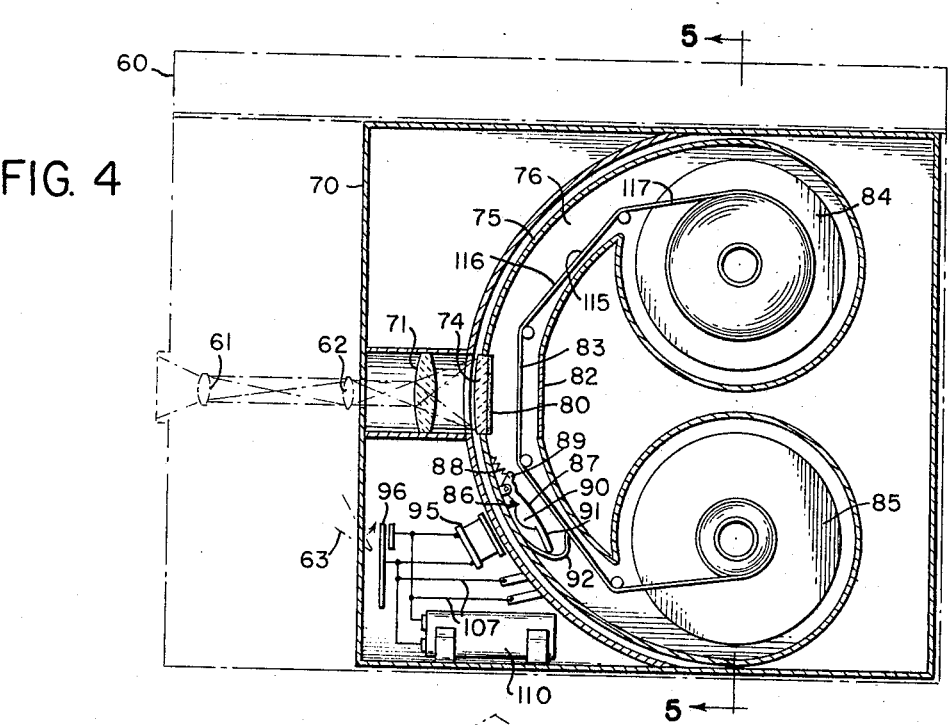
Figure 3:
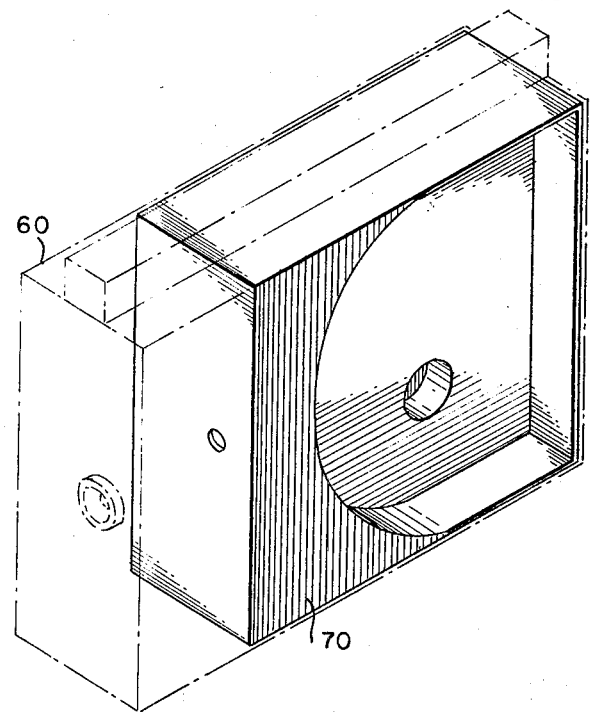
Figure 5:
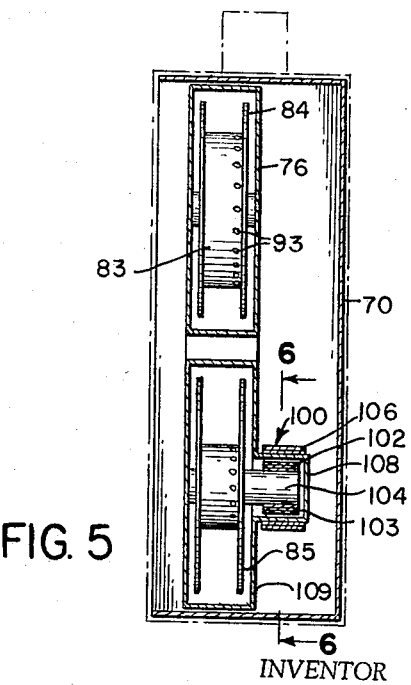

Other objects and advantages of the invention will be apparent from the following description taken in conjunction with the accompanying drawings in which:

FIG. 1 is a perspective view of copying apparatus constructed in accordance with the present invention;

FIG. 2, a fragmentary sectional view on the line 2—2 of FIG. 1 with certain of the electrical connections shown schematically;

FIG. 3, a perspective view of a conversion unit designed for insertion within a conventional motion picture camera of the prior art to permit the taking of motion picture films in accordance with the preent invention;

FIG. 4, a cross-sectional view of the unit shown in FIG. 3;

FIG. 5, a sectional view on the line 5—5 of FIG. 4;

FIG. 6, a side view of the conversion unit of FIG. 3 illustrating the side of the device opposite to that visible from FIG. 3;

FIG. 7, a perspective view of the film cannister used with the camera of FIG. 4;

FIG. 8, a sectional view of a motion picture camera constructed according to a different embodiment of the present invention;

FIG. 9, a sectional view of the motion picture camera of FIG. 8 taken on the line 9—9 of FIG. 10;

FIG. 10, a sectional view on the line 10—10 of FIG. 8;

FIG. 11, a perspective view of an electric motor used to drive the film take-up spool of the device of FIG. 10, the motor unit being broken away on the line 11—11 of FIG. 10.

FIG. 12, a perspective view of a film cannister or magazine used with device of FIG. 4;

FIG. 13, a sectional view on the line 13—13 of FIG. 12.

Briefly stated, the present invention contemplates the formation of a relatively permanent photographic picture on a film having a coating of a substance which forms visible indicia at points where it is struck by electrically charged particles. In one embodiment of the invention the film coating is an ink carrying a suspension of small pigment particles which are attracted to areas of the film on which electron charges occur. The source of the electrons is an image screen having a cesium oxide coating. This substance emits electrons when it is excited by light. A camera lens or some other device forms a light image upon this image screen, and the cesium oxide coating then emits electrons from the various areas of its surface in amounts related to the intensity of light striking the given area. A positively charged backing plate attracts these electrons to the film which is positioned between the image screen and the backing plate. After the ink particles have been attracted to this area the particles are fixed in their locations by heat from an infrared lamp.

In an alternative embodiment of the invention the picture is formed by the action of electrons striking a film coating including metallic sodium. Sodium atoms struck by the electrons are ionized and migrate from the film, thus leaving empty spots which form the image in conjunction with the dark areas containing the un-ionized sodium particles. The film is contained within a closed cannister including an inert gas which facilitates the electron flow from the image screen to the film. The cannister includes a mechanism for advancing a web of film from a feed roll to a take-up roll past an image forming station at which successive photographic images are formed by the lens of a motion picture camera. Upon completion of the exposure the film is ready for projection.

Referring to the drawing, particularly FIGS 1 and 2, a visible mark 10 is carried on a transparent plate 11 which is held by clips 12 to an image screen 13 having a cesium oxide coating 14 on the side opposite transparent plate 11.

Image screen 13 is made of glass or some similar transparent material and is fixed perpendicularly to a base plate 17 made of metal and covered with an insulation layer 18. A light source 22 is mounted so as to cast light through the image plate onto the image screen 13 and the cesium oxide coating 14 at all places except those in the shadow of visible marker 10. Cesium oxide has the property of emitting electrons when excited by light and this emission is increased by heat. A heating coil 23 is therefore mounted on the base 17 in close proximity to the image screen to facilitate such release of electrons under the influence of light.

A pair of channel-shaped runners 24 are fixed to the base plate in a position to hold a film 26 parallel to and spaced a small distance from the side of image screen 13 carrying the cesium oxide coating. Film 26 is covered by a layer of ink 27 which consists of a suspension of pigment particles 28 in an oil coating 29. Applicant has used an ink sold under the trade name Unimark. Information on this ink is available from the Electrostatic Printing Corporation of America, San Francisco, Calif. The pigment particles 28 in this ink are attracted to areas of high electron concentration.

A backing plate 31 is fixed and electrically connected to the base plate 17. The backing plate 31 is positioned parallel to and spaced slightly behind film 26 when mounted in the runners 24. It is maintained at a 15 volt positive potential by electrical connections hereafter described. This positive electrical potential holds electrons emitted by the cesium oxide coating 14 on the film 26 in positions correspinding to the image pattern for a sufficient period of time so that the pigment particles 28 may cluster within the areas where the electrons are located.

Base plate 17 carries a 6 volt rectifying transformer 22′ connected to a 110 volt A.C. source. The plus lead 34 of the 6 volt source is connected to the metallic portion 19 of the base plate which in turn is electrically connected to backing plate 31. The negative lead 35 is connected to one of the runner members 24 so that film 26 has a negative potential of 6 volts. A 9 volt battery 40 has its plus lead 41 connected to backing plate 31 thus placing a total positive electrical potential of 15 volts on the backing plate. The negative lead 42 of battery 40 is connected to image screen 13 in the area of a cesium oxide coating. This places the coating under a 9 volt negative potential. The 9 volt leads 41 and 42 are also connected to opposite ends of heating coil 23.

A drying plate 46 is carried on the base plate 17 on which film 26 is placed beneath an infrared lamp 47 after the pigment particles 28 have clustered in the areas of high electron concentration. The oil coating 29 is dried by the heat of infrared lamp 27 and the pigment particles become bonded to the film in the desired position and thus form a negative reproduction of the image.

In operation light from source 22 strikes transparent plate 11 and light passes through to image screen 13 on all areas except in the shadow of the visible marker 10. The cesium oxide coating having been previously heated by heating coil 23 emits electrons 50 from various portions of its surface in amounts related to the intensity of the light striking the given portion of the surface.

Electrons are attracted from the image screen which carries a negative potential of 9 volts and to the cesium oxide coating which carries the lesser negative potential of 6 volts. This mild attractive force is reinforced by the stronger 15 volt positive potential of the backing plate 31 which holds the electrons in the desired image pattern. Pigment particles 28 are attracted to areas of high electron conconeration. After the pigment particles have been concentrated the power leads are disconnected and the film is placed on drying plate 46 where the oil layer 29 is dried and the pigment particles 28 are bonded to the film by the heat of infrared lamp 47 to form a relatively permanent negative reproduction of the image.

FIGS. 3 to 7 disclose a modification of the invention intended to produce positive permanent pictures on a transparent motion picture film which will be suitable for projection immediately upon complete exposure of a roll of film. A conventional motion picture camera 60 of the type currently used with film developed by chemical processes includes lenses 61 and 62 and film advance sprocket leg 63 which normally engages the film sprocket holes. A conversion unit 70 to adapt to the camera 50 for use with applicant's invention includes a lens 71 which enlarges the image formed by the camera lenses 61 and 62 and projects it upon an image screen 74 carried in the front portion of the peripheral wall 75 of a film cannister 76. Image screen 74 carries a cesium oxide coating 80 which emits electrons which are attracted toward a backing plate 82 mounted in the rear portion of the peripheral wall 75 of the cannister. The opposite leads of a battery 110 are connected to image screen 74 and backing plate 82 to maintain a potential difference between the two.

Film 83 is moved between image screen 74 and backing plate 82 from a feed spool 84 to a take-up spool 85 by a magnetically actuated advance mechanism 86. Advance mechanism 86 includes a rocker arm 87 pivoted to the inner wall of cannister 76 and biased by spring 88 connecting one leg 89 of the rocker arm 87 and the cannister inner side of peripheral wall 75 of the cannister 76. A magnet 90 is mounted on the other leg 91 of rocker 87. Leg 91 engages a spring sprocket leg 92 which is fixed to the inner side of the cannister peripheral wall 75. The far end of spring sprocket leg 92 engages and moves sprocket holes 93 in film 83 to move the film in time with the shutter mechanism of camera 60. Conversion unit 70 includes an electromagnet 95 periodically energized by closure of a switch 96 by the motion of film advance sprocket leg 63 of camera 60. Switch 96 is of spring metal normally biased to the open position.

The film advance mechanism also includes an electric motor 100 for rotating take up reel 85. This includes permanent magnets 102 and 103 on the shaft 104 of reel 85. External electromagnets 106 mounted on the outer walls of a cylindrical projection 108 of the side wall 109 of the cannister 76 are periodically actuated by switch 96 to rotate the take-up spool. Power for the electric motor 100 is supplied by the battery 110 through power leads 107.

Film cannister 76 contains an inert atmosphere of xenon gas at low pressure in order to avoid impeding electron flow. Cannister 76 carries a tear strip 112 about the center of peripheral wall 75. When a roll of film is completely exposed the cannister is torn open by use of this strip. The cannister itself is of relatively inexpensive construction, the most expensive items therein being the image screen with its cesium oxide coating which is salvageable after use.

The film used with the motion picture embodiment carries a coating of metallic sodium particles 115 embedded in a wax coating 116 carried by a transparent film 117. The sodium particles are mixed with powdered sulphur, two parts of powdered metallic sodium and one part of sulphur being mixed in melted wax which is then coated on the film 117. When the electrons strike the metallic sodium individual atoms of sodium are ionized and migrate from the film as a gas to leave vacant areas on the film. The vacant areas on the film will be proportional to the electron intensity which in turn is related to the light intensity on given portions of the image screen. The un-ionized particles of sodium appear as dark areas which with the vacant areas form a permanent positive reproduction of the image cast upon the screen.

Another embodiment of the invention is illustrated in FIGS. 8 to 13. A camera 160 includes a lens 161 and a shutter mechanism 164. An image screen 174 is carried on the front of a peripheral wall 175 of a film cannister 176. Image screen 174 has a cesium oxide coating 177 and is located in front of a backing plate 178. Leads 179 and 180 of the battery 181 are connected respectively to the image screen and the backing plate to maintain a positive potential difference on the backing plate toward which electrons emitted from the image screen are attracted. Film 183 is advanced from a feed spool 184 to a take-up spool 185 by a magnetically actuated step advance mechanism 186 and an electric motor 200 built into the camera.

Shutter mechanism 164 is arranged to open and close a power circuit from battery 181 to an electromagnet 190 in syncronization with the opening and closing of the lens shutter. A pivoted rocker arm 186 has a leg 189 made of magnetic metal such as iron. Its opposite leg 192 serves as a sprocket leg to engage sprocket hole 193 in the film. An electric motor 200 includes stator windings 201, a rotor 202 carrying armature windings 203, and a rotating disk 204 concentrically fixed to the end of rotor 202 and carrying two permanent magnets 205, 206 on its outer surface near the periphery at points spaced 180° from each other. Film take-up spool 185 carries two permanent magnets 207, 208 on the sides of the spool at locations substantially identical to the spacing of magnets 205 and 206 on rotor disk 204. The take-up spool 185 is mounted for rotation within the cannister on a fixed shaft 209.

The camera and the cannister are designed so that rotor 202 and shaft 209 have aligned axes.

Cannister 176 includes a bottom wall 211 and a peripheral side wall 212 which defines therewith generally cylindrical portions 213 and 214 which form recesses for the film feed spool 184 and take-up spool 185.

A top wall 215 closes the area of the cannister between the cylindrical portions 213 and 214. The cylindrical portions 213 and 214 have inwardly extended flanges 216 carrying gaskets 217 and lids 219 and 220 are held closed by screws 221 and 222 which are threaded in shaft 209 of the take-up spool and 223 of the feed spool. The lids are secured tightly enough to maintain an inert atmosphere within the cannister. The film 183 utilized includes a coating of sodium particles identical to that used with film 83. If desired, other photographic chemicals which are decomposed by the action of electrons might be used alternatively.

In operation an image is formed on image screen 174 during a period when shutter mechanism 164 is open and sprocket leg 192 just has moved the film to a position between image screen 174 and backing plate 178. Electrons are emitted from various areas of the cesium oxide coating 177 in amounts related to the intensity of light striking the area. Flow of the electrons toward film 183 is facilitated by the inert atmosphere within the cannister and the electric potential maintained on the backing plate 178. Sodium particles on the film 183 are ionized by the electrons and migrate from the films as a gas, thus leaving holes or recesses in the sodium coating. The remaining sodium appears dark in color and with the empty areas forms a positive reproduction on the film corresponding to the image formed upon the image screen 174 by the camera lens 171.

When the shutter 168 closes, power is supplied to electromagnet 186 which actuates sprocket arm 190 to move unexposed film in front of the image screen 174. When the shutter opens another image is formed and the process continues. Electric motor 200 continually rotates the permanent magnets 206 and 207 on the rotor disk 204. The magnets 207 and 208 follow the rotor magnets 204 and 205 from inside the cannister to rotate take-up spool 185. The magnetic drive of the take-up spool permits slippage between rotor 202 and take-up spool 185 to absorb the irregularities of the step like motion of the film past the image screen.

It will be readily apparent that a relatively simple mechanism has been disclosed for the formation of photographic reproductions of images which does not require complex development procedure after the exposure of film to light. The permanent pictures are formed immediately after the projection of images on an associated image screen. This screen emits electrons from its various areas in amounts dependent upon the intensity of the light forming the image in a given area; the electrons strike a film having a coating that forms areas whose density is related to the amount of electrons striking the film. Because of the simplicity and the compactness of the apparatus it is particularly suitable for motion picture use, and for mounting the film in cartridges to simplify camera operation. It might also be mounted in small units to convert prior art cameras of the chemical development type for use with applicant's electro-photographic process.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A unit for use in the forming of relatively permanent reproductions of images comprising an image screen having emitting means thereon for emitting electrically charged particles from points on its surface in amounts which vary with the intensity of light striking the screen at various points, means spaced from said surface emitting electrically charged particles for attracting the electrically charged particles, means for mounting a film between said screen surface and said means for attracting the electrically charged particles, and said film having a coating consisting principally of two parts powdered metallic sodium and one part powdered sulphur suspended in paraffin for forming long-lasting reproductions on the film.

2. The structure of claim 1 including a heating coil located adjacent to said image screen means to facilitate release of electrically charged particles therefrom.

3. A motion picture camera comprising a camera body having an image-forming screen means, said screen means having a coating of a material which emits electrically charged particles when excited by light, the emission of said particles being in direct proportion to the intensity of light, means for applying a negative electrical charge to said screen means, image projection means for projecting an image onto said screen means, motion picture shutter means for rapidly interrupting the action of said image projecting means, backing plate means spaced from said image screen means, means for applying a positive electrical charge to said backing plate means, film means located between said image screen means and said backing plate means and in the path of movement of the electrically charged particles from said image screen means, said film having a coating consisting principally of two parts powdered metallic sodium and one part powdered sulphur particles which form visible indicia when struck by the electrically charged particles, and film-moving means for intermittently moving said film in synchronization with said shutter means, whereby electrically charged particles emitted by said screen means engage the particles on said film to form a visible indicia.

4. In a unit for forming permanent reproductions of images by means of an image screen having a coating of material which emits electrically charged particles when excited by light and backing plate means for attracting the emitted electrically charged particles, that improvement comprising a film located between said image screen and said backing plate means and disposed in the path of flow of said electrically charged particles, said film having a coating of particles thereon consisting principally of two parts powdered metallic sodium and one part powdered sulphur suspended in paraffin and which forms visible indicia in direct relation to the intensity of the electrically charged particles when struck thereby.

References Cited
UNITED STATES PATENTS

| | | | |
|---|---|---|---|
| 2,409,454 | 10/1946 | Thomas | 95—1.7 X |
| 2,676,100 | 4/1954 | Huebner | 95—1.7 X |
| 2,707,162 | 4/1955 | Fries. | |
| 2,758,525 | 8/1956 | Moncrieff-Yeates | 95—1.7 X |
| 3,281,200 | 10/1966 | Weninger | 352—78 |
| 2,549,546 | 4/1951 | Thomas | 250—49.5 (61) |
| 2,692,948 | 10/1954 | Lion | 250—65.2 |
| 2,891,911 | 6/1959 | Mayer | 117—17.5 |
| 3,187,340 | 6/1965 | Misawa | 352—72 |
| 3,234,018 | 2/1966 | Wendt | 117—17.5 |

NORTON ANSHER, Primary Examiner

M. H. HAYES, Assistant Examiner

U.S. Cl. X.R.

250—49.5, 65; 352—72; 355—3